United States Patent [19]

Westermann et al.

[11] 3,821,158

[45] June 28, 1974

[54] POLYMER COMPOSITION

[75] Inventors: Peter Henry Westermann, Dorking; Sidney George Fogg, Ashstead, both of England

[73] Assignee: BP Chemicals International Limited, London, England

[22] Filed: Oct. 25, 1972

[21] Appl. No.: 300,744

Related U.S. Application Data

[63] Continuation-in-part of Ser. No. 164,419, July 20, 1971, abandoned.

[52] U.S. Cl............ 260/42.18, 260/878 R, 260/889, 260/42.32, 260/42.53, 260/42.37
[51] Int. Cl...... C08d 9/08, C08f 29/04, C08f 29/08
[58] Field of Search............ 260/878 R, 889, 41.5 R

[56] References Cited
UNITED STATES PATENTS

| | | | |
|---|---|---|---|
| 2,832,748 | 4/1958 | Safford et al. | 260/889 |
| 2,912,410 | 11/1959 | Cole | 260/889 |
| 3,741,931 | 6/1973 | Martin et al. | 260/889 |

FOREIGN PATENTS OR APPLICATIONS

| | | | |
|---|---|---|---|
| 589,941 | 12/1959 | Canada | 260/889 |
| 842,205 | 7/1960 | Great Britain | 260/878 R |

*Primary Examiner*—Joseph L. Schofer
*Assistant Examiner*—A. Holler

[57] ABSTRACT

Thermosetting moulding compositions comprising at least 50 percent of an inorganic filler, a high vinyl butadiene polymer, a free radical initiator and polyethylene in an amount less than 100 percent of the polymerisable material as shrink controller are described. The high vinyl butadiene polymer preferably contains 65 percent of 1,2-bonded units (i.e., units containing pendant vinyl groups) and can be used in conjunction with copolymerisable monomers. The polyethylene can be a homo- or copolymer and preferably has a density in the range 0.915 to 0.96. Low density or a mixture of low and high density polyethylene are particularly preferred. The compositions have low shrinkage on thermosetting and have good tensile strength in the thermoset state.

12 Claims, No Drawings

POLYMER COMPOSITION

This application is a continuation-in-part of Ser. No. 164,419, filed July 20, 1971, now abandoned.

The present invention relates to thermosetting moulding compositions based on high vinyl butadiene polymers and inorganic fillers.

Conventional polymers of 1,3-butadiene, for example those produced by free radical aqueous emulsion processes, contain chains of polymerised butadiene units, each unit being chemically bonded to adjacent units in the chain in either the 1 and 2 positions as shown in (a) or the 1 and 4 positions as shown in (b).

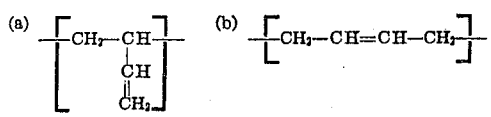

Generally, free radical emulsion polymerisation tends to give butadiene polymer containing mainly the 1,4-bonded units and relatively few 1,2-bonded units. Butadiene polymers and copolymers containing more than about 25 percent of the 1,2-bonded units are defined in this specification as high vinyl butadiene polymers and can be made, for example, by alkali metal catalysed polymerisation. High vinyl butadiene polymers are known to have useful thermosetting properties.

By a thermosetting moulding composition is meant throughout this specification a composition comprising at least 50 percent of an inorganic filler based on the weight of the total composition which can be fabricated into hard infusible shaped articles by the action of heat and pressure, for example by pressing in a heated mould. Examples of such thermosetting moulding compositions are reinforced or unreinforced compositions, preimpregnated mats or other forms of reinforcement in preimpregnated form and preformed moulding compositions.

Examples of inorganic filler that can be used are various types of carbon blacks, silicas, aluminas, and calcium silicate, titanium dioxide, zinc sulphide, calcium carbonate, zinc oxide, magnesia and clays. Part of the filler can consist of reinforcing materials such as for example glass and asbestos fibres, woven or non-woven mats and chopped strands.

A problem encountered in the thermosetting of compositions of this type is that of shrinkage, such shrinkage being particularly undesirable in many moulding applications.

An object of the present invention is to provide thermosetting moulding compositions having improved properties. A further object of the invention is to provide thermosetting moulding compositions having reduced shrinkage properties.

Accordingly the present invention provides a thermosetting moulding composition comprising (a) at least 50 percent by weight of an inorganic filler (based on the weight of the total composition) and (b) a polymerisable component comprising a high vinyl butadiene polymer and a free radical initiator, in which the improvement consists of the presence of a shrink controller, said shrink controller being an ethylene homopolymer or an ethylene copolymer containing at least 85 percent of copolymerised ethylene units, the amount of said shrink controller being not more than 100 percent by weight of the amount of the polymerisable component.

Preferably the quantity of inorganic filler present is at least 200 percent of the weight of the polymerisable component.

The high vinyl butadiene used in the composition of the present invention preferably contains at least 30 percent of 1,2-bonded units and most preferably at least 65 percent of 1,2-bonded units. Particularly useful thermosetting moulding compositions can be made using high vinyl butadiene polymer containing about 85 percent of 1,2-bonded units. Suitably the viscosity average molecular weight of the polymer is in the range 500 to 500,000 and preferably in the range 1000 to 200,000, where the viscosity is measured in an Ostwald viscometer using toluene as solvent at 25°C and the viscosity average molecular weight is calculated from the intrinsic viscosity ($\eta$) using the equation $(\eta) = 1.69 \times 10^{-4}(M\overline{v})^{0.73}$ The polymerisable component may contain a monomer or monomers known to copolymerise with the high vinyl butadiene polymer for example styrene, vinyl toluene, diethyl fumarate, diethyl maleate, dibutyl fumarate, acrylamide, methacrylamide, N,N'-methylenebisacrylamide, ethylene glycol dimethacrylate, alkylmethacrylate and trimethylol propane trimethacrylate.

Suitably the polymerisable component can contain up to 50 percent of the copolymerisable monomer based on the weight of high vinyl butadiene polymer. A thermosetting moulding composition comprising a high vinyl butadiene polymer, a free radical initiator and an acrylamide compound having the general formula $H_2C{:}CRCONHR'$ wherein R is hydrogen or an organic hydrocarbon substituent and R' is hydrogen or an organic substituent is described in our British Patent Application No: 36295/70 filed July 27, 1970 referred to in the Application documents as Case CPE.2894 and entitled "Polymer Composition" and in our corresponding U.S. Pat. application Ser. No: 164,421 filed July 20, 1971.

The initiator is suitably an organic peroxide compound examples of such compounds being ditertiarybutylperoxide, tertiarybutylperbenzoate, tertiarybutylperoctoate, benzoyl peroxide, 1,1-ditertiarybutylperoxy-3,3,5-trimethylcyclohexane and tertiarybutylperacetate. Useful thermosetting moulding compositions are obtained using bis(alkylperoxy) mononuclear aromatic compounds as initiators, for example, 1,3 or 1,4-bis (tertiarybutylperoxy isopropyl) benzene. A thermosetting moulding composition comprising a high vinyl butadiene polymer and a free radical initiator comprising a bis (alkylperoxy) mononuclear aromatic compound is described in our British Patent Application No: 36294/70 filed July 27, 1970 referred to in the Application documents as Case CPE.2931 and entitled "Polymer Composition" and in our corresponding U.S. Pat. application Ser. No: 164,422 filed July 20, 1971.

Mixtures of initiators can be used if desired.

Suitable concentrations of initiator used in the thermosetting moulding compositions are in the range 1 to 10 percent based on the weight of high vinyl butadiene polymer.

The polyethylene shrink controller used in the compositions of the present invention can be low, medium or high density polyethylene and mixtures of these can be used if desired. The preferred polyethylene shrink controller has a density in the range 0.915 to 0.96. Low density polyethylene having a density in the range 0.915 to 0.925 is particularly preferred.

In a preferred composition according to the present invention the polyethylene shrink controller comprises a mixture of low density polyethylene having a density in the range 0.915 to 0.925 with a high density polyethylene having a density above 0.94. When it is desired to use a blend of this type the ratio of low density to high density polyethylene in the blend is preferably in the range 3:1 to 1:3. The densities of the polyethylene throughout this specification are given in g/ml and are measured by the method described in British Standard Specification 2782, Method 509A.

Preferably the concentration of the polyethylene shrink controller is at least 5 percent based on the weight of the polymerisable component and most preferably is in the range 10 to 70 percent.

In a preferred composition according to the present invention the polymerisable component consists only of high vinyl polybutadiene and a free radical initiator.

If desired, additional materials capable of controlling shrinkage can be incorporated in the thermosetting moulding compositions of the present invention for example polystyrene, poly-N-phenylacrylamide and chlorinated polyethylene; polymeric materials such as rubbery or liquid isobutene polymers; and saturated liquid polymers such as polypropylene adipate, polypropylene sebacate and polypropylene glycol.

When it is desired to incorporate polystyrene into the composition of the present invention, preferably monomeric styrene is also incorporated at a concentration in the range 100 to 200 percent based on the weight of the polystyrene.

The various components of the thermosetting moulding compositions of the present invention can be mixed together in any order, conventional mixing apparatus being used if desired. If desired, a diluent for example hexane or toluene can be used to facilitate the mixing of the components and all, or the bulk of the diluent can then be removed under vacuum or by heating to a temperature below about 100°C preferably under vacuum or in a stream of nitrogen. Heating the composition to temperatures not greater than about 100°C can also be used to promote better mixing of the components.

When glass fibre is used as reinforcement in the compositions of the present invention it is preferred to use at least some diluent to facilitate the mixing and minimise mechanical damage to the fibre.

Where fillers such as glass fibre, silica, quartz or clay are incorporated in the thermosetting moulding compositions of the present invention, adhesion promoting silanes for example vinyltris (beta-methoxy ethoxy) silane can, if desired, be included to improve the adhesion between the filler and the thermoset components in the thermoset products.

Antioxidants for example butylated hydroxy toluene (BHT) can be incorporated in the thermosetting moulding compositions of the present invention to prolong their shelf life.

The thermosetting of the moulding compositions is suitably carried out at temperatures in the range 140° to 250°C and at pressure in excess of 100 psig.

The thermosetting moulding compounds of the present invention show less shrinkage on thermosetting than similar compounds wherein no polyethylene shrink controller is used. They have good tensile strength in the thermoset state. They are useful for making, for example, articles such as pump impellors and mouldings for electrical applications.

The following examples illustrate the preparation and properties of thermosetting moulding compositions.

EXAMPLE 1

A thermosetting moulding composition was prepared using the following ingredients:

| | |
|---|---|
| High vinyl butadiene polymer $M\bar{v}$ = 25,000 1,2 content = 76% | 85 pbw |
| Calcium carbonate filler | 300 |
| 1,3 bis (t-butylperoxyisopropyl) benzene | 4 |
| Low density polyethylene (sold under the trade name of Alkathene 200 by ICI) | 40 |
| ¼ inch chopped glass fibres | 75 |

Mixing was continued for 10 minutes at 100°C by which time the low density polyethylene was well dispersed in the thermosetting moulding composition.

Test specimens of this composition were moulded at 180°C for 5 minutes at approximately 10 tons/sq. in. The physical properties of the test specimens were as follows:

| | |
|---|---|
| Flexural modulus Kg/cm$^2$ | 60,000 |
| Flexural strength Kg/cm$^2$ | 1,160 |
| Tensile strength Kg/cm$^2$ | 350 |
| Impact strength Kg/cm/cm$^2$ | 18 |
| Mould shrinkage cm/cm | 0.0026 |
| Barcol hardness | 27 |

The mouldings containing polyethylene showed a smooth surface free of cracks and ripple and 1 mm thick mouldings did not warp.

EXAMPLE 2

A thermosetting moulding composition was prepared from the following ingredients:

| | |
|---|---|
| High vinyl butadiene polymer ($M\bar{v}$ = 12,000 1,2 content = 72%) | 85 pbw |
| Calcium carbonate filler | 300 |
| 1,3 bis (t-butylperoxy isopropyl) benzene | 4 |
| Low density polyethylene (sold under the trade name of Alkathene 200) | 20 |
| High density polyethylene (sold under the trade name of Rigidex 90 T) | 10 |
| ¼ inch chopped glass fibres | 75 |

Mixing was carried out for 15 minutes at 105°C by which time both the low density and high density polyethylenes were well dispersed in the thermosetting moulding composition.

Test specimens of this composition were moulded at 180°C for 5 minutes and the following results were obtained.

| | |
|---|---|
| Flexural modulus Kg/cm$^2$ | 62,000 |
| Flexural strength Kg/cm$^2$ | 1,010 |
| Tensile strength Kg/cm$^2$ | 390 |
| Impact strength Kg/cm/cm$^2$ | 24 |
| Mould shrinkage cm/cm | 0.0025 |
| Barcol hardness | 46 |

Mouldings made from this composition were similar to those obtained in Example 1. In addition impact strength and Barcol hardness were improved by the use of a mixture of high and low density polyethylene rather than low density polyethylene on its own.

EXAMPLES 3 – 6

Thermosetting moulding compositions according to the present invention (Examples 5 and 6) and by way of comparison (Examples 3 and 4) were prepared by mixing the components (see Table 1) in a Brabender Plastograph using a rubber mixing head. All four compositions each contained calcium carbonate filler (300 p.b.w.), ¼ inch chopped glass fibre (75 p.b.w.) and 1,3-bis-(t-butylperoxyisopropyl) benzene (4 p.b.w.) in addition to the components shown in the Table 1. The mixing was carried out at a temperature of 85° – 120°C for 10 – 15 minutes. The moulding compositions were then thermoset at 180°C for 5 minutes in a mould at approximately 10 tons per square inch. The mould shrinkage on thermosetting for each composition was measured and is shown in Table 1.

TABLE 1

| Example No. | High Vinyl Butadiene Polymer (p.b.w.) | Polyethylene "Alkathene 200" (p.b.w.) | Weight ratio of Polyethylene: High vinyl butadiene polymer | Mould Shrinkage cm/cm |
|---|---|---|---|---|
| 3 | 125 | 0 | 0 : 100 | 0.0050 |
| 4 | 50 | 75 | 60 : 40 | 0.0069 |
| 5 | 62.5 | 62.5 | 50 : 50 | 0.0037 |
| 6 | 85 | 40 | 32 : 68 | 0.0024 |

Notes on Table 1.
 p.b.w. = parts by weight
 The high vinyl butadiene had Mv = 6046 and contained 83% of 1,2-polymerised units.
 Alkathene 200 is a low density polyethylene commercially available from Imperial Chemical Industries Ltd.

Example 3 demonstrates the mould shrinkage of a high vinyl butadiene polymer thermosetting moulding composition comprising no polyethylene shrink controller. Example 4 demonstrates that when the polyethylene:high vinyl butadiene polymer ratio is 60:40 the mould shrinkage is greater than when no polyethylene is present in the composition. When the ratio is 50:50 (i.e. when the amount of polyethylene is 94 percent by weight of the amount of the polymerisable component) it can be seen that shrinkage control is obtained (cf Examples 3 and 5). Example 6 demonstrates that even better shrinkage control occurs when the ratio is 32:68.

We claim:

1. In a thermosetting moulding composition comprising (a) at least 50 percent by weight of an inorganic filler, based on the weight of the total composition, and (b) a polymerisable component comprising a high vinyl butadiene polymer and a free radical initiator, the improvement consisting in the presence of at least 5 percent based on the weight of the polymerisable component of a shrink controller, said shrink controller being an ethylene homopolymer or an ethylene copolymer containing at least 85 percent of copolymerized ethylene units, the amount of said shrink controller being not more than 100 percent by weight of the amount of the polymerisable component.

2. A thermosetting moulding composition according to claim 1 wherein the high vinyl butadiene polymer contains at least 65 percent of 1,2-bonded units.

3. A thermosetting moulding composition according to claim 1 wherein the amount of filler present is at least 200 percent of the weight of the polymerisable component.

4. A thermosetting moulding composition according to claim 1 wherein the polymerisable component contains a monomer or monomers capable of copolymerising with the high vinyl butadiene polymer.

5. A thermosetting moulding composition according to claim 4 wherein the copolymerisable monomer or monomers are selected from styrene, vinyl toluene, diethyl fumarate, diethyl maleate, dibutyl fumarate, acrylamide, methyacrylamide, N,N'-methylenebisacrylamide, ethylene glycol dimethacrylate, allyl methacrylate and trimethylol propane trimethacrylate.

6. A thermosetting moulding composition according to claim 1 wherein the free radical initiator is dicumyl peroxide.

7. A thermosetting moulding composition according to claim 1 wherein the free radical initiator is 1,3 or 1,4-bis-(tertiarybutyl peroxy isopropyl) benzene.

8. A thermosetting moulding composition according to claim 1 wherein the polyethylene shrink controller is low density polyethylene having a density in the range 0.915 to 0.925.

9. A thermosetting moulding composition according to claim 1 wherein the polyethylene shrink controller is a mixture of low and high density polyethylene, the high density polyethylene having a minimum density of 0.94.

10. A thermosetting moulding composition according to claim 1 wherein the concentration of the polyethylene shrink controller is in the range 10 to 70 percent based on the weight of the polymerisable component.

11. A thermosetting moulding composition of reduced shrinkage properties as compared to a like composition free from a shrinkage control agent, which composition comprises at least 50 percent to at least 200 percent by weight of an inorganic filler, based on the weight of the polymerisable component, which latter comprises a high vinyl butadiene polymer, a free radical initiator and at least 5 percent based on the weight of the polymerisable component of a shrink controller which is an ethylene homopolymer or an ethylene copolymer containing at least 85 percent of copolymerized ethylene units in an amount not more than 100 percent by weight of the amount of the polymerisable component.

12. A thermosetting moulding composition according to claim 11 wherein the shrink controller is a mixture of polyethylene having a density in the range of 0.915 to 0.96 and polyethylene having a density above 0.94 in the ratio of 3:1 to 1:3.

* * * * *